3,284,530
PROCESS FOR ISOLATING OLEFINS FROM MIXTURES BY ABSORPTION
Ernst Nölken, Frankfurt am Main, Germany, assignor to Farbwerke Hoechst Aktiengesellschaft vormals Meister Lucius & Bruning, Frankfurt am Main, Germany, a corporation of Germany
No Drawing. Filed June 18, 1963, Ser. No. 288,594
Claims priority, application Germany, June 27, 1962, F 37,168
9 Claims. (Cl. 260—677)

The solutions of some heavy metals absorb, as is well known, olefins and other unsaturated organic compounds with the formation of reversible complex compounds. This behavior is technically used, for example, when pure ethylene is isolated from mixtures with other gases, by conducting the gaseous mixtures, for example, through a silver or copper salt solution, wherein the ethylene is absorbed, and by desorbing the absorbed ethylene in a second stage by lowering the pressure or raising the temperature.

It is also known, for example, from U.S. Patent 2,913,505 that silver fluoborate solutions are particularly suitable in the preparation of olefins on an industrial scale, because they can be prepared in higher concentrations than the solutions of other silver salts, for example, of the nitrate, the sulfate or the fluoride, owing to the good solubility of the silver fluoborate, and because they can absorb more olefins owing to their higher silver content.

It has also been proposed (Belgian Patent 616,796), for the purpose of further improving the absorption capacity of silver fluoborate solutions, to use solutions not containing equivalent quantities of silver- and fluoborate ions, but an excess of fluoborate ions compared with the silver ions. These solutions made it possible to increase considerably the absorption of olefins and also of aromatic hydrocarbons from gaseous mixtures containing same. The absorptive power of the silver fluoborate solutions is evidently proportional to the concentrations of the silver ions as well as to that of the fluoborate ions. However, the possibility of further increasing the concentration of silver ions and/or fluoborate ions in these solutions and with them the absorption of olefins is limited as soon as the solubility product of the silver fluoborate is exceeded.

The use of solutions containing the maximum amount of dissolved silver ions and fluoborate ions is, therefore, particularly advantageous in industry, since the dimensions of the apparatus in the production plants can be relatively small.

The present invention is based on the observation that coordination compounds of boron trifluoride are able to increase considerably the capacity of silver fluoborate to absorb olefins. The capacity of silver fluoborate to absorb, for example, ethylene, which amounts to 20–30 Nl (N=under normal conditions of pressure and temperature) of ethylene per 1 mol of Ag$^+$ ions in an aqueous solution or in an aqueous solution containing free fluoboric acid, can be increased 2 to 3 times by using coordination compounds of boron trifluoride.

As coordination compounds of boron trifluoride can be used, for example, the coordination compounds of boron trifluoride with water, such as boron trifluoride dihydrate [H$_3$O]$^+$[BF$_3$OH]$^-$, which as such or mixed with water represents a good solvent for silver fluoborate. Solutions of silver fluoborate in pure boron trifluoride dihydrate as well as the solutions of silver fluoborate in mixtures of boron trifluoride dihydrate and water increase the capacity of silver fluoborate to absorb olefins.

Coordination compounds that are also suitable for use include, for example, compounds in which the boron trifluoride is additively combined with aliphatic or cyclo- aliphatic alcohols containing up to 10 carbon atoms, such as BF$_3$·2CH$_3$OH, BF$_3$·2C$_2$H$_5$OH, BF$_3$·2 (n, iso, sec. or tert.) C$_4$H$_9$OH or BF$_3$·2C$_5$H$_{11}$OH. Finally, coordination compounds of boron trifluoride compounds with aliphatic or cycloaliphatic carboxylic acids having up to 8 carbon atoms, such as BF$_3$·2HCOOH, BF$_3$·2CH$_3$COOH,

BF$_3$·2CH$_3$CH$_2$COOH or BF$_3$·(CH$_3$)$_2$—CH—COOH can also be used. As solutions of silver fluoborate in the boron trifluoride coordination compounds mentioned above there can be used according to the invention the solutions of silver fluoborate in the pure coordination compounds, as well as their mixtures with one another or with the complex component of boron trifluoride, such as water, alcohol or carboxylic acid.

The coordination compounds of boron trifluoride mentioned above represent good solvents for silver fluoborate. As coordination compounds of boron trifluoride for the absorption of olefins can also be used suspensions of silver fluoborate as well as the solid solutions of silver fluoborate in boron trifluoride complex compounds or their mixtures, since their capacity of absorbing olefins is also increased and the dispersed silver fluoborate is dissolved while absorbing olefin, and/or the solid solutions become liquid absorbing olefin, and/or the solid solutions become liquid. The solutions of silver fluoborate in the boron trifluoride compounds mentioned above can be prepared by dissolving solid AgBF$_4$ in the boron trifluoride coordination compounds or by introducing BF$_3$ into the components of the coordination compounds, i.e., mixtures of boron trifluoride and water, of boron trifluoride and alcohol and of boron trifluoride and carboxylic acids.

The boron trifluoride addition compounds are advantageously used in quantities within the range of from 0.5 to 3.0, particularly of from 0.5 to 2.0 mols per 1 mol of silver fluoborate.

Compared with aqueous solutions, solutions of AgBF$_4$ in the boron trifluoride compounds mentioned above not only possess an increased capacity of absorbing olefins, but they also have the advantage that the absorption and the desorption of the olefins and with it their separation from gaseous mixtures can be carried out at temperatures which are considerably higher than those admissible in processes hitherto known, for example, up to 140° C. Temperatures below 0° C. generally are not used.

The silver fluoborate solutions containing boron trifluoride complexes can be used for separating olefins, particularly olefinic hydrocarbons having up to 10 carbon atoms, preferably normally gaseous olefins, such as ethylene, propylene and butenes, from preferably gaseous mixtures containing saturated hydrocarbons. Additionally these mixtures may contain nitrogen, oxygen and/or carbon dioxide.

The following examples serve to illustrate the invention but they are not intended to limit it thereto:

*Example 1*

In a glass flask provided with a stirrer, a thermometer, an inlet and an outlet tube and holding 500 ml. 194.7 g. of silver fluoborate were dissolved in 103.8 g. of boron trifluoride dihydrate at 50° C., and subsequently a gaseous mixture containing 65% by volume of ethylene, 23% by volume of ethane and 12% by volume of propane was introduced into the solution while stirring. Because of the absorption heat set free the temperature inside the flask rapidly rose to 90° C.; the flask was cooled with water of 20° C. As soon as the temperature inside the flask had decreased to 20° C., while further introducing the gaseous mixture, the absorption was finished. There were introduced altogether 120 l. of the gaseous mixture mentioned above into the solution. After having been passed through the silver fluoborate solution the gaseous mixture had the following composition: 38.1% by volume of ethylene, 40.6% by volume of ethane and 21.2% by volume of propane.

Subsequently the ethylene was desorbed by heating the silver fluoborate solution saturated with ethylene. The ethylene obtained was free from propane and ethane. When increasing the temperature to 120° C., the separated ethylene was desorbed quantitatively, i.e. 54 Nl per 1 mol of $AgBF_4$.

In a comparison test carried out as mentioned above, however, with the use of an aqueous silver fluoborate solution containing 7.5 mols of $AgBF_4$ per 1 l. of solution instead of the solution of silver fluoborate in boron trifluoride dihydrate, there were separated from the gaseous mixture mentioned above only 25 Nl of ethylene per 1 mol of $AgBF_4$.

Analogously the separation capacity of solutions of silver fluoborate in boron trifluoride coordination compounds was greater than that of aqueous silver fluoborate solutions containing free fluoboric acid.

When proceeding as described in Example 1, using instead of the solution of silver fluoborate in boron trifluoride dihydrate an aqueous silver fluoborate solution containing 7.0 mols of $AgBF_4$ and 3.5 mols of $HBF_4$ per 1 l. of solution, there were separated from the gaseous mixture mentioned above only 29 Nl of ethylene per 1 mol of $AgBF_4$.

*Example 2*

This example was carried out analogously to Example 1; however, there were added to the absorption solution 0.5 mol of water; there were obtained by means of this solution 42 Nl of ethylene from this gaseous mixture.

*Example 3*

In the apparatus as described in Example 1, 194.7 g. of silver fluoborate were dissolved in 94 g. of

$BF_3 \cdot 2CH_3COOH$ and subsequently a gaseous mixture containing 50% by volume of ethylene, 25% by volume of butane and 25% by volume of isobutane was introduced into the solution while stirring and outside cooling. 96 l. of the gaseous mixture were introduced into the solution and then the absorption was interrupted. The gas leaving the solution had the following composition: 6% by volume of ethylene, 47% by volume of butane and 47% by volume of isobutane. The increase in weight of the flask contents indicated the absorption of 45 l. of ethylene. Pure ethylene was desorbed from the solution under reduced pressure. After a complete desorption further ethylene could be separated from the above mentioned gaseous mixture poor of ethylene, by means of the silver boron trifluoride solution.

*Example 4*

100 l. of a gaseous mixture containing 90% by volume of propylene, 6% by volume of propane and 4% by volume of butane were introduced into a solution of 194.7 g. of silver fluoborate in 108 g. of $BF_3 \cdot 2$ tert. butanol, while cooling and stirring. The average composition of the gas leaving the solution was 78% by volume of propylene, 13% by volume of propane and 8.8% by volume of butane. Under reduced pressure 54 Nl of propylene were dissolved from the silver fluoborate solution free from propane and butane.

I claim:
1. In the process for the isolation of olefinic hydrocarbons from olefin-containing mixtures by the absorption of the olefins by means of silver fluoborate solutions, the steps which comprise adding 0.5–3 mols of an addition compound of boron trifluoride selected from the group consisting of boron trifluoride dihydrate, and addition product of boron trifluoride containing 2 molecules of an aliphatic alcohol having up to 10 carbon atoms, an addition product of boron trifluoride containing 2 molecules of a cycloaliphatic alcohol having up to 10 carbon atoms, an addition product of boron trifluoride containing 2 molecules of an aliphatic carboxylic acid having up to 8 carbon atoms, an addition product of boron trifluoride containing 2 molecules of a cycloaliphatic carboxylic acid having up to 8 carbon atoms and of mixtures of these compounds, per 1 mol of silver fluoborate, and isolating the olefinic hydrocarbons at a temperature up to 140° C.

2. A process as claimed in claim 1, in which the silver fluoborate solution contains in a free form, besides the boron trifluoride complex compound, a component participating in the formation of the complex compound.

3. A process for separating an olefinic hydrocarbon from an olefin-containing mixture which comprises bringing said mixture into contact with a silver fluoborate solution containing from about 0.5 to about 3 mols of an addition compound of boron trifluoride selected from the group consisting of boron trifluoride dihydrate, an addition product of boron trifluoride with an aliphatic or cycloaliphatic alcohol having up to 10 carbon atoms, an addition product of boron trifluoride with an aliphatic or cycloaliphatic carboxylic acid having up to 8 carbon atoms, or a mixture thereof, per mol of silver fluoborate.

4. A process as defined in claim 3, wherein the silver fluoborate solution contains from 0.5 to 2 mols of said addition compound per mol of silver fluoborate.

5. A process as defined in claim 3, wherein the addition compound is boron trifluoride dihydrate.

6. A process as defined in claim 3, wherein the addition compound is $BF_3 \cdot 2CH_3COOH$.

7. A process as defined in claim 3, wherein the addition compound is $BF_3 \cdot 2$ tert. butanol.

8. A process as defined in claim 3, wherein the olefinic hydrocarbon is ethylene.

9. A process as defined in claim 3, wherein the olefinic hydrocarbon is propylene.

References Cited by the Examiner

UNITED STATES PATENTS 3,007,981  11/1961  Baker et al. _____ 260—677
3,101,381  8/1963  Baxter et al. _____ 260—677

ALPHONSO D. SULLIVAN, *Primary Examiner.*